United States Patent
Komine

(10) Patent No.: US 12,014,091 B2
(45) Date of Patent: Jun. 18, 2024

(54) PRINTING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Isao Komine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/134,162

(22) Filed: Apr. 13, 2023

(65) Prior Publication Data
US 2023/0342090 A1    Oct. 26, 2023

(30) Foreign Application Priority Data

Apr. 22, 2022    (JP) ................................ 2022-070952

(51) Int. Cl.
*G06F 15/00*    (2006.01)
*G06F 3/12*     (2006.01)
*H04N 1/54*     (2006.01)

(52) U.S. Cl.
CPC .......... *G06F 3/1205* (2013.01); *G06F 3/1208* (2013.01); *G06F 3/1255* (2013.01); *G06F 3/1256* (2013.01); *H04N 1/54* (2013.01)

(58) Field of Classification Search
None
See application file for complete search history.

(56) References Cited

U.S. PATENT DOCUMENTS

| | | | |
|---|---|---|---|
| 2020/0210117 A1* | 7/2020 | Miyasaka | G06F 3/1205 |
| 2020/0336622 A1* | 10/2020 | Kunimi | H04N 1/00482 |
| 2022/0019392 A1* | 1/2022 | Maeo | G06F 3/1273 |
| 2022/0066348 A1* | 3/2022 | Matsuno | G06F 3/121 |
| 2022/0256056 A1* | 8/2022 | Takasaki | H04N 1/0044 |
| 2022/0256057 A1* | 8/2022 | Kawai | H04N 1/54 |

FOREIGN PATENT DOCUMENTS

JP    2019-213114 A    12/2019

* cited by examiner

*Primary Examiner* — Mark R Milia
(74) *Attorney, Agent, or Firm* — VENABLE LLP

(57) ABSTRACT

A printing apparatus capable of performing spot color printing using a spot color printing material of a spot color that is a color different from a process color, includes: an acquisition unit configured to acquire print data including image data for an image of a print target, wherein if the print data is data used to cause the printing apparatus to execute the spot color printing, the print data includes information about the spot color printing; and a display control unit configured to display, on a display part of the printing apparatus, a preview screen of the image of the print target. Whether to display the preview screen on the display part of the printing apparatus is controlled based on the print data.

20 Claims, 11 Drawing Sheets

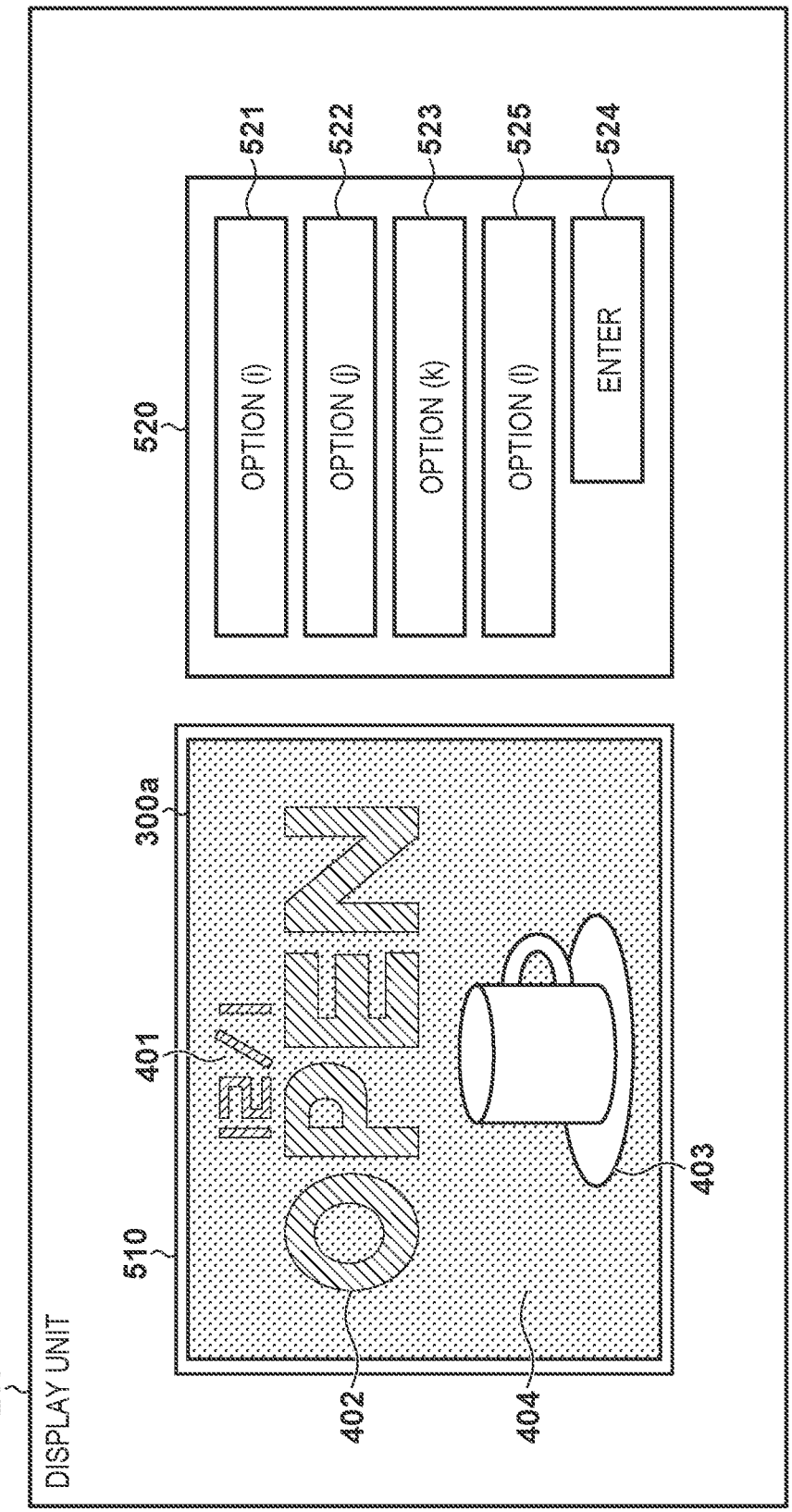

F I G. 10A

| CONDITION | INPUT | | OUTPUT | |
|---|---|---|---|---|
| | PRINT COMMAND (SPOT COLOR PRINT SETTING) | IMAGE DATA (PIXEL VALUE DESIGNATED FOR SPOT COLOR) | DISPLAY PREVIEW | DISPLAY OPTIONS |
| — | SPOT COLOR PRINTING ON | PRESENT | ON (SPOT COLOR DISPLAY) | OPTION (i),(j),AND(k) |
| — | SPOT COLOR PRINTING ON | ABSENT | ON (NORMAL COLOR DISPLAY) | OPTION (k),AND(l) |
| B | SPOT COLOR PRINTING OFF | PRESENT | ON (NORMAL COLOR DISPLAY) | OPTION (j),(k),AND(l) |
| A | SPOT COLOR PRINTING OFF | ABSENT | OFF | OFF |

F I G. 10B

| CONDITION | INPUT | | | OUTPUT | |
|---|---|---|---|---|---|
| | MAIN BODY SETTING | PRINT COMMAND (SPOT COLOR PRINT SETTING) | IMAGE DATA (PIXEL VALUE DESIGNATED FOR SPOT COLOR) | DISPLAY PREVIEW | DISPLAY OPTIONS |
| — | SPOT COLOR PRINTING ON | SPOT COLOR PRINTING ON | PRESENT | ON (SPOT COLOR DISPLAY) | OPTION (i),(j),AND(k) |
| — | SPOT COLOR PRINTING ON | SPOT COLOR PRINTING ON | ABSENT | ON (NORMAL COLOR DISPLAY) | OPTION (k),AND(l) |
| B | SPOT COLOR PRINTING ON | SPOT COLOR PRINTING OFF | PRESENT | ON (NORMAL COLOR DISPLAY) | OPTION (j),(k),AND(l) |
| A | SPOT COLOR PRINTING ON | SPOT COLOR PRINTING OFF | ABSENT | OFF | OPTION (k),AND(l) |
| — | SPOT COLOR PRINTING OFF | SPOT COLOR PRINTING ON | PRESENT | ON (NORMAL COLOR DISPLAY) | OPTION (i),(k), AND(l) |
| — | SPOT COLOR PRINTING OFF | SPOT COLOR PRINTING ON | ABSENT | ON (NORMAL COLOR DISPLAY) | OPTION (k),AND(l) |
| B | SPOT COLOR PRINTING OFF | SPOT COLOR PRINTING OFF | PRESENT | OFF | OFF |
| A | SPOT COLOR PRINTING OFF | SPOT COLOR PRINTING OFF | ABSENT | OFF | OFF |

PRINTING APPARATUS, METHOD, AND NON-TRANSITORY COMPUTER-READABLE STORAGE MEDIUM STORING PROGRAM

BACKGROUND OF THE INVENTION

Field of the Invention

The present invention relates to a printing apparatus, a method, and a non-transitory computer-readable storage medium storing a program.

Description of the Related Art

There is conventionally known spot color printing that uses a spot color different from normal printing using normal process colors (CMYK). In spot color printing, an image is printed using a spot color printing material (ink, toner, or the like) such as a transparent color, a metallic color, or a fluorescent color. Use of spot color printing enables high-quality printing that cannot be expressed by normal process colors. As an example of a method of generating print data to perform spot color printing, a specific process color is replaced with a spot color. Japanese Patent Laid-Open No. 2019-213114 proposes an information processing apparatus that generates image data by replacing a portion where the concentration of a specific process color satisfies a predetermined condition with a spot color.

SUMMARY OF THE INVENTION

The present invention provides a technique of suppressing execution of printing with a setting unintended by a user.

The present invention in one aspect provides a printing apparatus capable of performing spot color printing using a spot color printing material of a spot color that is a color different from a process color, comprising: an acquisition unit configured to acquire print data including image data for an image of a print target, wherein if the print data is data used to cause the printing apparatus to execute the spot color printing, the print data includes information about the spot color printing; and a display control unit configured to display, on a display part of the printing apparatus, a preview screen of the image of the print target, wherein whether to display the preview screen on the display part of the printing apparatus is controlled based on the print data.

According to the present invention, it is possible to suppress execution of printing with a setting unintended by a user.

Further features of the present invention will become apparent from the following description of exemplary embodiments with reference to the attached drawings.

BRIEF DESCRIPTION OF THE DRAWINGS

FIG. 5 is a view showing an example of the configuration of a display unit;
FIG. 10A is a view showing the display mode of the display unit when the flowchart of FIG. 7 is executed;
FIG. 10B is a view showing the display mode of the display unit when the flowchart of FIG. 8 is executed.

DESCRIPTION OF THE EMBODIMENTS

Figure 1:
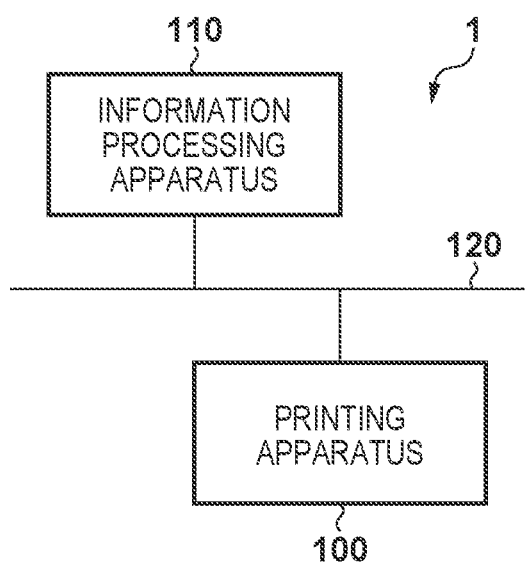
FIG. 1 is a view showing an image processing system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A printing apparatus sometimes executes printing in accordance with the setting of a print command included in print data acquired from an information processing apparatus or the like or a setting included in the header of image data. Examples of such settings are a paper size, single-sided/double-sided printing designation, and N-up printing (4-in-1 or 2-in-1). The printing apparatus also sometimes performs printing in accordance with not only a setting included in a print command or the like but also a main body setting held on the printing apparatus side. Hence, depending on setting contents to be preferred, printing may be executed with a setting unintended by a user.

According to the present disclosure, it is possible to suppress execution of printing with a setting unintended by a user.

First Embodiment (System Configuration)
FIG. 1 is a view showing an image processing system 1 according to the first embodiment. The image processing system 1 is a system configured to execute printing of an image using print data 310 (see FIGS. 3A and 3B), and includes a printing apparatus 100 and an information processing apparatus 110. The printing apparatus 100 and the information processing apparatus 110 are configured to be communicable with each other via a network 120.

The printing apparatus 100 executes printing using the print data 310 received from the information processing apparatus 110. The printing apparatus 100 can execute normal printing using process colors (CMYK) and spot color printing using spot color printing materials. As the printing method of the printing apparatus 100, various methods such as an inkjet method, an electrophotographic method, an offset printing method, and a screen printing method can be employed. In the following description, the printing apparatus 100 is assumed to be an inkjet printing apparatus that forms an image by discharging ink to a print medium.

The information processing apparatus 110 generates the print data 310 and transmits the print data 310 to the printing apparatus 100 via the network 120. Details of the print data 310 will be described later. The information processing apparatus 110 can be, for example, a desktop Personal Computer (PC), a laptop PC, a tablet terminal, a smartphone, or a print server. Here, the information processing apparatus 110 is shown as a single element. However, a plurality of information processing apparatuses 110 may be connected to each other via the network 120 and construct a print server.

The network 120 is a computer network configured to enable data communication between the information processing apparatus 110 and the printing apparatus 100. For example, depending on the scale, the network 120 can be classified into a Local Area Network (LAN), a Wide Area Network (WAN), or the Internet. The LAN is constructed by, for example, Universal Serial Bus (USB) connection, wireless LAN connection by Wi-Fi®, or wired LAN connection using a LAN cable. When the Internet is used, the print data 310 stored in a cloud server can be transmitted to the printing apparatus 100 via the Internet. As a communication protocol of network communication, for example, Transmission Control Protocol/Internet Protocol (TCP/IP) can be used. Use of TCP/IP enables communication between various information processing apparatuses 110 such as a PC and the printing apparatus 100.

(Hardware Configuration)

Figure 2:
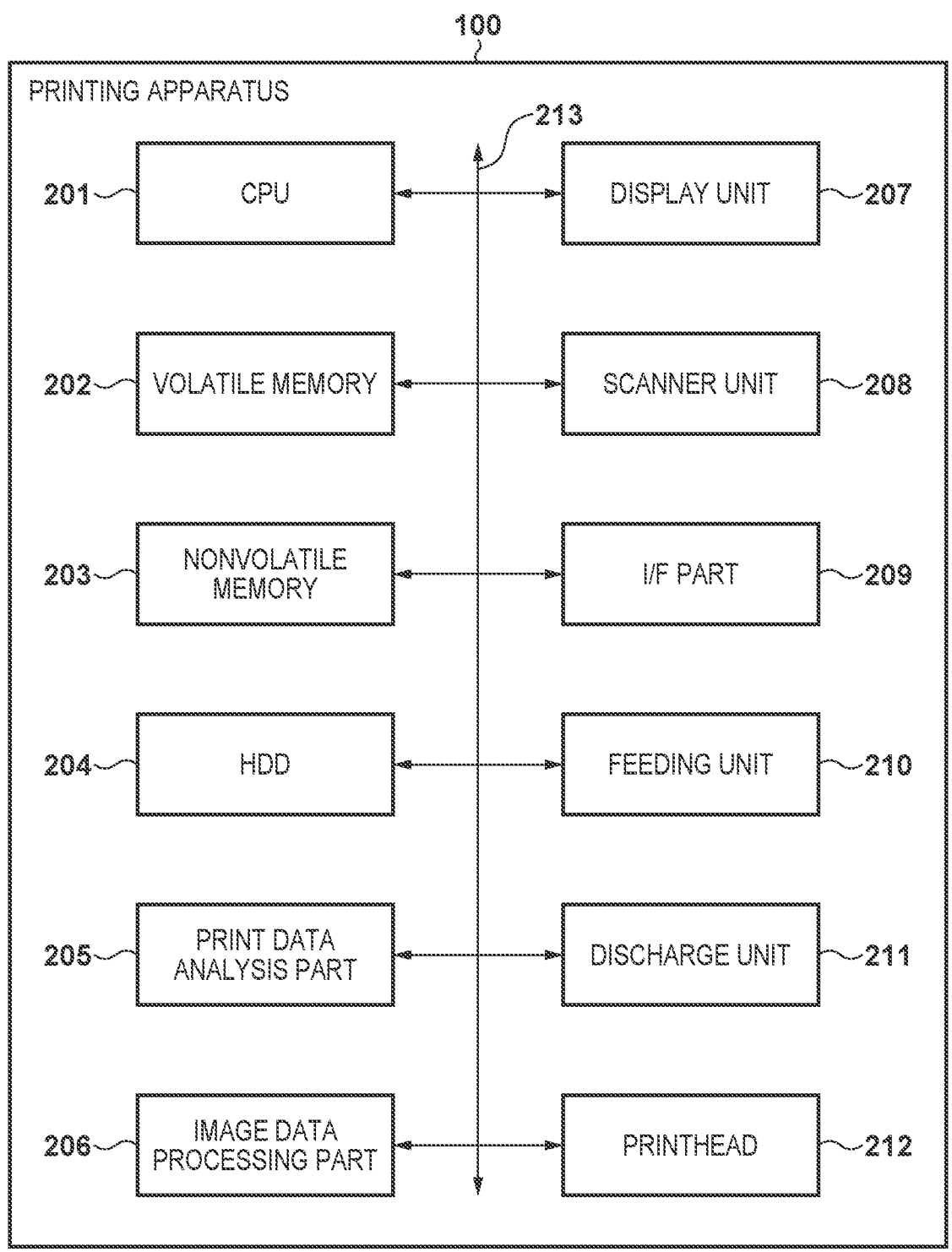
FIG. 2 is a view showing the hardware configuration of a printing apparatus.

FIG. 2 is a view showing the hardware configuration of the printing apparatus 100. Each constituent element can transmit/receive a control signal via a bus 213.

A Central Processing Unit (CPU) 201 is a system control part and comprehensively controls the entire the printing apparatus 100. A volatile memory 202 is, for example, a Random Access Memory (RAM), and operates as the work area of the CPU 201. A nonvolatile memory 203 is, for example, a Read Only Memory (ROM), and stores the control program of the CPU 201, an Operating System (OS) program, a print setting designated and set by the user from an operation part, and the like. The CPU 201 executes various kinds of processing (for example, processing shown by the flowchart of FIG. 7) by reading out the control program stored in the nonvolatile memory 203 to the volatile memory 202 and executing. The volatile memory 202 is also used to store a program control variable, and the like. The volatile memory 202 is also used as a buffer configured to temporarily store image data 300.

A Hard Disk Drive (HDD) 204 is used to hold the print data 310 received by the printing apparatus 100. An interface (I/F) part 209 relays transmission/reception of a signal to/from an external apparatus. For example, the print data 310 transmitted from the information processing apparatus 110 is stored in the HDD 204 via the network 120 and the I/F part 209. That is, the I/F part 209 can include a communication interface. The I/F part 209 can also include a port capable of connecting another storage device or the like, such as a USB port.

A print data analysis part 205 analyzes a print command 311 included in the print data 310 stored in the HDD 204, and reflects print settings on a print job to be executed. The print command 311 will be described later (see FIG. 3A). An image data processing part 206 executes processing of the image data 300 included in the print data 310. For example, the image data processing part 206 decompresses the compressed image data 300 and converts it into a printable data size. Also, in this embodiment, the image data processing part 206 can determine whether a pixel value set for spot color printing is included in the image data 300. A display unit 207 displays various kinds of information. Details will be described later (see FIG. 5).

A scanner unit 208 includes an Auto Document Feeder (ADF) and a Flat Bed Scanner (FBS), and can perform reading of an original automatically fed by the ADF and reading (scan) of an original placed on the original table of the FBS by the user. The CPU 201 can generate the print data 310 by receiving the brightness signals (RGB or YCC) of a read scan image and store the generated print data 310 in the HDD 204.

Also, the printing apparatus 100 includes a feeding unit 210, a discharge unit 211, and a printhead 212. When execution of printing is instructed via an operation panel 520 or the information processing apparatus 110, and printable data is stored in the volatile memory 202, the feeding unit 210 conveys a print medium to a print position by the printhead 212 based on an instruction from the CPU 201. The printhead 212 discharges ink to the print medium, thereby forming an image. The discharge unit 211 conveys the print medium with the image formed thereon and discharges it. In this embodiment, the printhead 212 is equipped with not only inks (to be referred to as normal inks hereinafter) of process colors (CMYK) but also inks (to be referred to as special color inks hereinafter) of fluorescent colors called special colors. The special color is also called spot color.

Note that the normal inks are inks used to perform printing of process colors (normal colors) and include inks of colors such as cyan (C), magenta (M), yellow (Y), and black (K) that are the bases of process colors. A process color is a color expressed by one of CMYK colors or a combination of two or more of CMYK colors. In printing of process colors, the normal inks are used, and the spot color inks to be described later are not used.

A spot color ink is an ink which develops a spot color and, for example, whose color developed at the time of printing cannot be displayed in the SRGB color space. That is, the printing apparatus 100 is configured to be able to perform spot color printing that is printing using an ink of a spot color (that is, a spot color ink) other than the normal inks.

As the spot color inks, fluorescent pink ink, fluorescent orange ink, and the like can be used. That is, a spot color is a color that is different from the process colors and cannot be expressed by only one of CMYK colors or a combination of two or more of CMYK colors. However, the present invention is not limited to this form. The number and colors of spot color inks can be arbitrary, and inks of colors other than the fluorescent colors may be used. For example, violet ink, green ink, orange ink, gold ink, silver ink, and the like may be used as spot color inks. Inks of other metallic colors may also be used. Furthermore, an ink made by mixing a spot color ink and another ink (for example, a normal ink) can also be handled as a spot color ink. That is, in printing of spot color inks, at least a spot color ink is used, but both a spot color ink and a normal ink may be used. In printing using a spot color, a pixel having a pixel value corresponding to the spot color is printed by the spot color. Note that the pixel value corresponding to the spot color can also be used as a pixel value corresponding to a color (that is, a normal color) expressed only by normal inks. In other words, the same pixel value as the pixel value corresponding to the spot color is sometimes set to a pixel corresponding to the color expressed only by the normal inks. In this case, whether to use a special ink to print the pixel of the pixel value is controlled based on whether instruction information of spot color printing is added to print data.

(Configuration of Print Data)

Figure 3A:
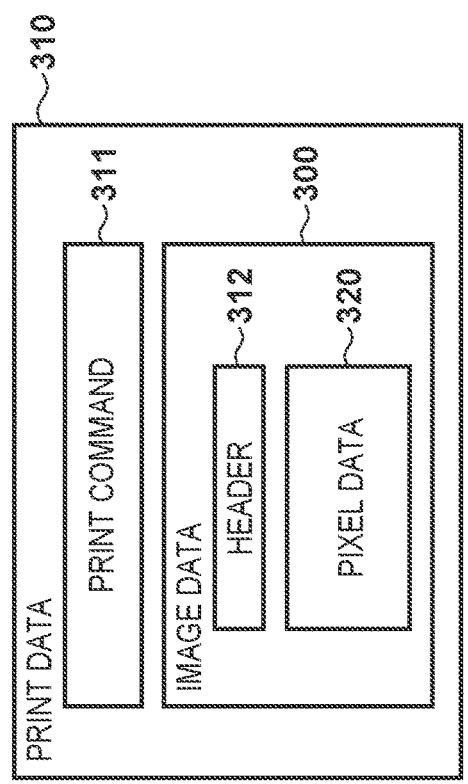
FIGS. 3A and 3B are views showing the configuration of print data generated by an information processing apparatus.
Figure 3B:
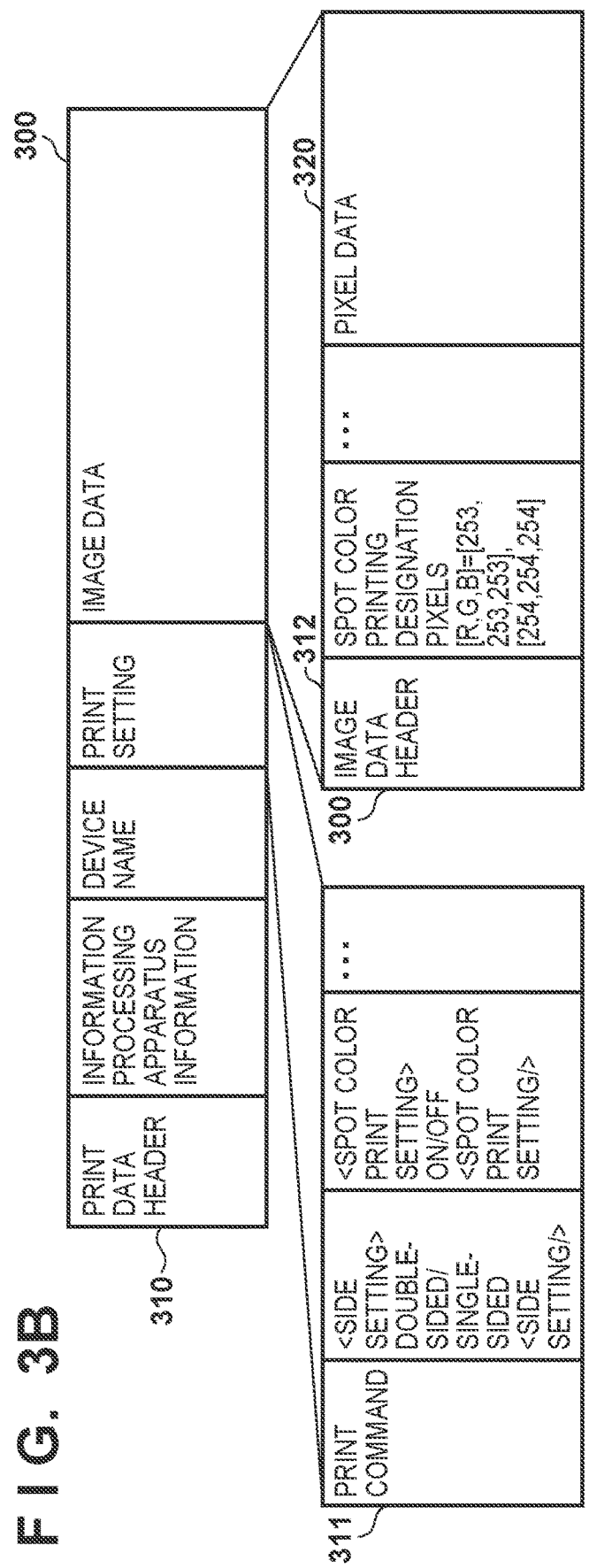

FIGS. 3A and 3B are views showing the configuration of the print data 310 generated by the information processing apparatus 110. The print data 310 is formed by the print command 311 and the image data 300.

The print command 311 includes commands concerning print settings such as a paper size, single-sided/double-sided printing designation, and N-up printing (4-in-1 or 2-in-1). Also, in this embodiment, the print command 311 includes a command concerning a spot color print setting representing whether to perform spot color printing. As will be described later in detail, the printing apparatus 100 switches preview display based on the spot color print setting representing whether to perform spot color printing and the image data 300. Note that in the case of a setting to perform spot color printing, the print command 311 includes a command concerning the spot color print setting indicating that spot color printing is to be performed. In the case of a setting not to perform spot color printing, configuration may be such that the print command 311 does not include a command concerning the spot color print setting indicating whether to perform spot color printing. If the print command 311 does not include the command concerning the spot color print setting indicating whether to perform spot color printing, the printing apparatus 100 may recognize it as a setting not to perform spot color printing.

The print command 311 is described in the XML format. For example, a character string enclosed between an opening tag <A> and a closing tag <A> can be set as a print setting A. FIG. 3B shows a double-sided/single-sided setting and a spot color print setting. The print data analysis part 205 can analyze the tags and read out the print setting. The readout print setting is stored in the volatile memory 202 and set as a print job setting when executing printing.

The image data 300 is configured to include a header 312 and pixel data 320. The header 312 includes information about the image data 300, and in this embodiment, includes information that designates pixel values to be printed by spot color printing, a file format, a pixel data size, and the like. The pixel data 320 is data including the pixel value of each pixel of the image of the print target. In this embodiment, the file format of the image data 300 is the RGB format, and the pixel data 320 has the pixel values of red (R), green (G), and blue (B) for each pixel. Note that in the following explanation, for the descriptive convenience, when simply referred to as a pixel value, it means a vector value formed by the pixel values of three, red (R), green (G), and blue (B) components, and a pixel value is expressed as, for example, [R, G, B]=[253, 253, 253]. Also, the pixel value is sometimes referred to as an RGB value.

Information that is included in the header 312 of the image data 300 and designates pixel values to be printed by spot color printing will be described next in detail. For example, in the example shown in FIG. 3B, pixel values (spot color printing designation pixels) designated for spot color printing are [R, G, B]=[253, 253, 253] and [254, 254, 254]. For example, fluorescent pink and fluorescent yellow can be assigned to the pixel values [R, G, B]=[254, 254, 254] and [253, 253, 253], respectively. For example, if the spot color print setting of the print command 311 is "perform spot color printing", printing using fluorescent pink is executed for pixels included in the pixel data 320 and having the pixel value [R, G, B]=[253, 253, 253]. That is, the image data 300 includes, as the information about spot color printing, the spot color print setting of the print command 311 and the pixel value of each pixel of the pixel data 320.

Note that an arbitrary value can be designated for a pixel value representing a spot color. Also, assignment of a corresponding fluorescent color may be described in the image data, as explained here, or may be stored in the main body of the printing apparatus 100. Two pixel values designated for spot color printing have been exemplified here. However, the number of pixel values set to spot color printing is not limited to this, and one pixel value or three or more pixel values may be set. The number can be changed in accordance with the types of spot color inks dischargeable by the printing apparatus 100.

(Generation of Print Data)

In this embodiment, the print data 310 is generated by the information processing apparatus 110. More specifically, application software capable of generating the print data 310 including the image data 300 and the print command 311 and causing the printing apparatus 100 to execute printing based on the generated print data 310 is installed in the information processing apparatus 110. Application software (application program) configured to set an object or a pixel value to be printed by spot color printing for the image data 300 of an image to be printed is also installed in the information processing apparatus 110. The application software is, for example, Illustrator® but is not limited to this.

The image data 300 generated by the application software may be raster data expressed in the RGB format or may be vector data expressed by an object such as a figure, coordinates, color information, and the like. For example, raster data has a file format like JPEG that compresses RGB data. In a case of raster data, designation of an object as a spot color print target by the application software may be designation of a region of an arbitrary pixel value (for example, the pixel value [R, G, B]=[253, 253, 253] representing fluorescent pink).

Also, the application software can display a region to accept whether to set spot color printing, and switches, based on an operation to the region, whether to set spot color printing. More specifically, for example, the application software can display a fluorescent pink spot color print setting. The fluorescent pink spot color print setting is a region that accepts selecting whether to enable spot color printing (fluorescent pink spot color printing) for printing, using fluorescent pink, a pixel having a pixel value corresponding to fluorescent pink. Note that if fluorescent pink spot color printing is not enabled, each pixel having the pixel value corresponding to fluorescent pink is printed in a process color that is not fluorescent pink. For this reason, the region can also be said as a region used to accept a setting concerning whether a pixel having a specific pixel value should be printed in fluorescent pink or a process color different from fluorescent pink. Also, for example, the region can be said as a region used to accept a setting concerning whether printing should be performed using a spot color ink or should be performed using not a spot color ink but a normal ink.

If the checkbox is on, and fluorescent pink spot color printing is set, instruction information for instructing the printing apparatus 100 to perform printing using fluorescent pink is added to the print data generated by the application software. Note that the instruction information corresponds to a spot color print setting representing that spot color printing is to be performed. If a pixel having a pixel value corresponding to fluorescent pink exists among pixels included in the print data to which the instruction information is added, the printing apparatus 100 executes printing using a spot color ink of fluorescent pink based on the print data.

If the checkbox is off, and fluorescent pink spot color printing is not set, instruction information for instructing the printing apparatus 100 to perform printing using fluorescent pink is not added to the print data generated by the application software. In this case, a spot color print setting indicating that spot color printing is not to be performed may be added to the print data. Even if a pixel having a pixel value corresponding to fluorescent pink exists among pixels included in the print data to which the instruction information is not added, the spot color ink of fluorescent pink is not used, and only normal inks are used to print the pixel. Note that another spot color print setting may be displayed, like the fluorescent pink spot color print setting. If spot color printing is set, a spot color ink is discharged to a pixel with a designated pixel value in the print data for which there is a print designation by a spot color.

Note that the print data generated in the above-described way may be transmitted from the information processing apparatus 110 to the printing apparatus 100 via the network or may be stored in a memory provided in the information processing apparatus 110. The memory provided in the information processing apparatus 110 may be an external memory attached to the information processing apparatus 110. The external memory is a Universal Serial Bus (USB) memory, an SD card, an external hard disk, or the like.

Note that the program that accepts a print setting from the user and generates the print data 310 is not limited to the above-described application program. For example, the program may be a printer driver or an OS.

(Example of Spot Color Printing)

Here, an example of the printing apparatus 100 that can perform printing by spot color inks of colors (special colors) that use predetermined six types of spot colors in a case where spot color printing is set by the application software will be described. If spot color printing is set by the application software, a pixel having a specific pixel value corresponding to a set spot color in the print data is printed using a spot color ink. In this embodiment, specific pixel values are assigned to the predetermined six types of colors.

In this embodiment, a specific pixel value is represented by, for example, R=254, G=254, and B=254. Using fluorescent pink ink, a pixel having the pixel value is printed in fluorescent pink that is one of the special colors. That is, the pixel value corresponding to fluorescent pink is [R, G, B]=[254, 254, 254]. Another specific pixel value is represented by, for example, R=253, G=253, and B=253. Using fluorescent yellow ink, a pixel having the pixel value is printed in fluorescent yellow that is one of the special colors. That is, the pixel value corresponding to fluorescent yellow is [R, G, B]=[253, 253, 253]. Still another specific pixel value is represented by, for example, R=255, G=85, and B=0. Using a mixture of fluorescent pink ink and M and Y inks, a pixel having the pixel value is printed in orange that is one of the special colors. That is, the pixel value corresponding to orange is [R, G, B]=[255, 85, 0].

Note that, for example, if orange ink can be used as a spot color ink, printing in orange may be performed using only the orange ink. That is, a pixel of a specific pixel value corresponding to a spot color need only be printed using at least a spot color ink, and the printing may be or may not be performed by mixing a normal ink. Note that as described above, in spot color printing as well, a pixel that is not a pixel of a specific pixel value corresponding to a spot color is printed using only normal inks. In addition, spot color printing is executed when spot color printing is enabled by a user operation. That is, if the spot color print setting is not enabled, even a pixel of a specific pixel value corresponding to a spot color is printed using only normal inks by referring to the pixel value as usual.

More specifically, if the application software enables the spot color print setting of fluorescent pink, and the pixel value of a pixel included in transmitted print data is represented by R=255, G=0, and B=255, the printing apparatus 100 can perform spot color printing using fluorescent pink ink. This also applies to other spot colors. That is, if the application software enables the print setting of each spot color, and the pixel value of each pixel included in transmitted print data is a pixel value corresponding to a spot color, the printing apparatus 100 can perform corresponding spot color printing. Note that if a printer driver 103 enables the spot color print setting, but a pixel having the above-described specific pixel value corresponding to the spot color printing is not included in the print data, spot color printing is impossible.

(Example of Image Based on Image Data)

Figure 4:
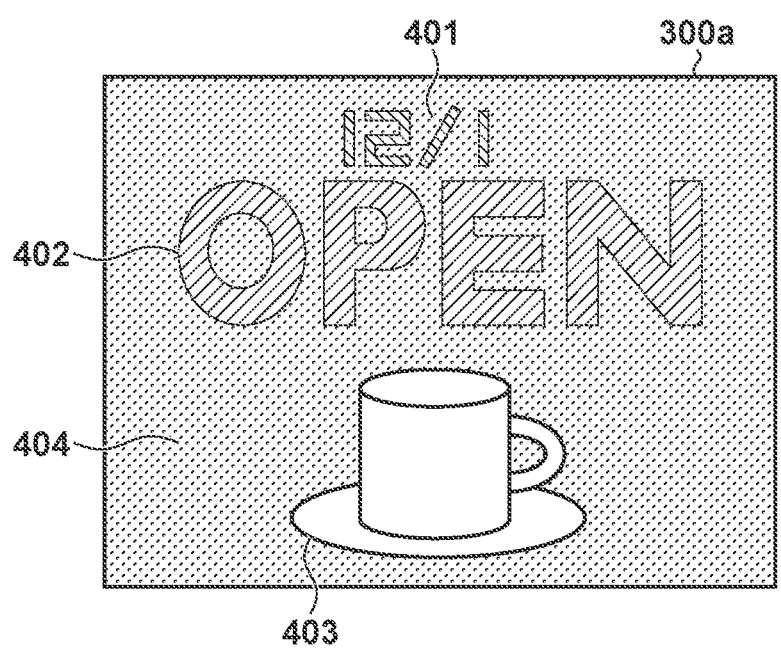
FIG. 4 is a view showing an example of an image based on image data.

FIG. 4 is a view showing an example of an image 300a based on the image data 300. The image 300a includes a character string "12/1" 401, a character string "OPEN" 402, a coffee cup 403, and a background 404. The file format of the image data is the RGB format, which is expressed by 8-bit values. For example, using the application software installed in the information processing apparatus 110, the user embeds the character string "12/1" 401 and the character string "OPEN" 402 in an original image formed from the coffee cup 403 and the background 404, thereby creating the image 300a. The character string "12/1" 401 and the character string "OPEN" 402 are data each having a pixel value. For example, the character string "12/1" 401 is data having a pixel value [R, G, B]=[254, 254, 254], and the character string "OPEN" 402 is data having a pixel value [R, G, B]=[253, 253, 253].

As shown in FIG. 3B, the print command 311 includes a spot color print setting. For example, if the spot color print setting is "perform spot color printing", a pixel having a pixel value represented by a spot color printing designation pixel included in the header 312 of the image data 300 is printed by a spot color. Spot color printing designation pixels are [253, 253, 253] and [254, 254, 254]. Hence, fluorescent pink that is one of the spot colors is assigned to the character string "12/1" 401, and fluorescent yellow that is one of the spot colors is assigned to the character string "OPEN" 402.

On the other hand, the coffee cup 403 and the background 404 are data having pixel values (RGB values) that are not designated for spot colors and are objects to be normally printed using normal inks.

(Display Unit)

FIG. 5 is a view showing an example of the configuration of the display unit 207 (display part). The display unit 207 includes the operation panel 520 used by the user to operate the printing apparatus 100, and a display panel 510 that displays the preview screen of the image 300a of the print target before execution of printing. In this embodiment, the CPU 201 executes display control of displaying, on the display unit 207, the preview screen of the image 300a of the print target. The display unit 207 according to this embodiment also has a function as an input device used by the user to do an operation input, as will be described below in detail.

In this embodiment, the display panel 510 configured to display a preview of an image based on the image data 300 is arranged on the left side of the display unit 207. The display panel 510 is a liquid crystal display supporting a touch panel, and the user can select an object such as a character or a figure in an image displayed on the display panel 510. On the display panel 510, the user can check whether the image is to be printed by spot color printing as intended.

For example, the display panel 510 makes the character string "12/1" 401 and the character string "OPEN" 402 designated for spot color printing blink, thereby notifying the user that these character strings are designated for spot color printing. In addition, the display panel 510 displays the coffee cup 403 and the background 404, which are not designated for spot color printing, without blinking. This allows the user to recognize each object designated for spot color printing by the difference from the display method of other objects.

Also, in this embodiment, the operation panel 520 is arranged on the right side of the display unit 207. The operation panel 520 is a liquid crystal display supporting a touch panel, like the display panel 510. The user can instruct the operation of the printing apparatus 100 by pressing each button displayed on the operation panel 520 in accordance with intention.

In FIG. 5, an option (i) button 521, an option (j) button 522, an option (k) button 523, an option (l) button 524, and a decision button 525 are displayed on the operation panel 520. That is, the display unit 207 can display a preview screen on the display panel 510 and simultaneously display, on the operation panel 520, a plurality of options (the option (i) button 521 to the option (l) button 524) used to instruct a print mode. The user can confirm the preview screen displayed on the display panel 510, and then select an option displayed on the operation panel 520 and decide the print mode of the printing apparatus 100 without switching screen display. The option buttons will be described below.

The option (i) button 521 is the button of an option for performing spot color printing for all of one or a plurality of objects designated for spot color printing. The option (j) button 522 is the button of an option for individually designating whether to perform spot color printing for each object printable by spot color printing. In other words, the option (j) button 522 is a button selected when performing spot color printing for some of a plurality of objects printable by spot color printing. The option (k) button 523 is the button of an option for canceling spot color printing designation of all objects printable by spot color printing and performing normal printing. Alternatively, the option (k) button 523 is a button used to select normal printing if the image data 300 includes no object printable by spot color printing. The option (l) button 524 is the button of an option for canceling printing. The decision button 525 is a button used to decide the print mode of the printing apparatus 100. The user confirms the option buttons and the preview screen switched by selection of an object on the preview screen, and presses the decision button 525 when a desired setting is obtained. This determines the print mode of the printing apparatus 100.

Here, the options selectable by the option (i) button 521 to the option (k) button 523 are options of a plurality of print modes with different degrees of use of spot color inks (spot color printing materials). That is, the option (i) button 521 is a button used to select the option of the print mode (all objects designated for spot color printing are printed by spot color printing) with the highest degree of use of spot color inks. The option (k) button 523 is a button used to select the option of the print mode (spot color printing designation of all objects printable by spot color printing is canceled) with the lowest degree of use of spot color inks. The option (j) button 522 is a button used to select the option of the print mode (some objects printable by spot color printing are printed by spot color printing) in which the degree of use of spot color inks is the intermediate degree between the two print modes described above. Thus, since the options of the plurality of print modes with different degrees of use of spot color inks are presented, the user can instruct the printing apparatus 100 to do printing in a mode more suitable for his/her intention.

Also, in this embodiment, as will be described later in detail, options are displayed on the operation panel 520 in accordance with information about spot color printing included in the acquired image data 300. Since the options according to the information about spot color printing are selected, options according to the intention of the user can be presented.

Note that on the display unit 207, ten keys that allow the user to input numbers and a STOP button that allows the user to cancel execution of a print operation or other operations of the printing apparatus 100 may be arranged in addition to the operation panel 520. At least some of the keys and the buttons may be formed not by a touch panel but by physical keys. In this embodiment, the display unit 207 includes two independent panels (the display panel 510 and the operation panel 520). However, a region that displays the preview screen and a region that displays the option buttons may be provided in a single panel. That is, the display unit 207 need only be configured to simultaneously perform display of the preview screen and display of the options, and the detailed structure and the like can appropriately be changed.

(Screen Examples of Preview Screen)

Figure 6A:
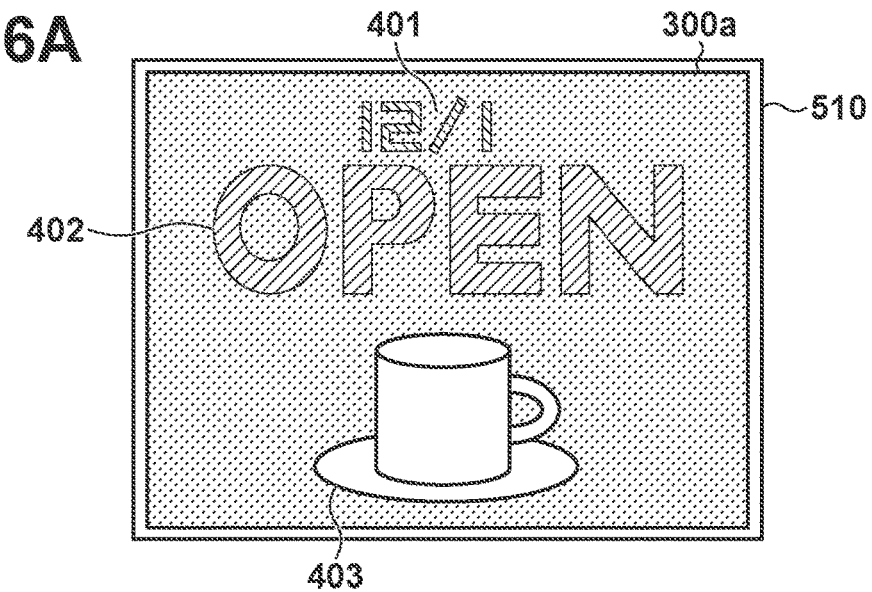
FIGS. 6A to 6C are views showing examples of a preview screen displayed on a display panel.
Figure 6B:
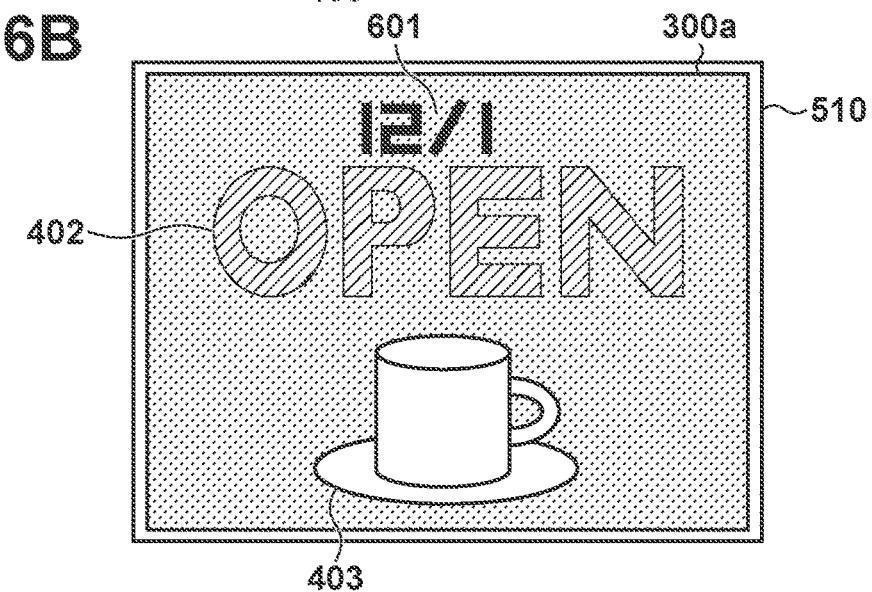
Figure 6C:
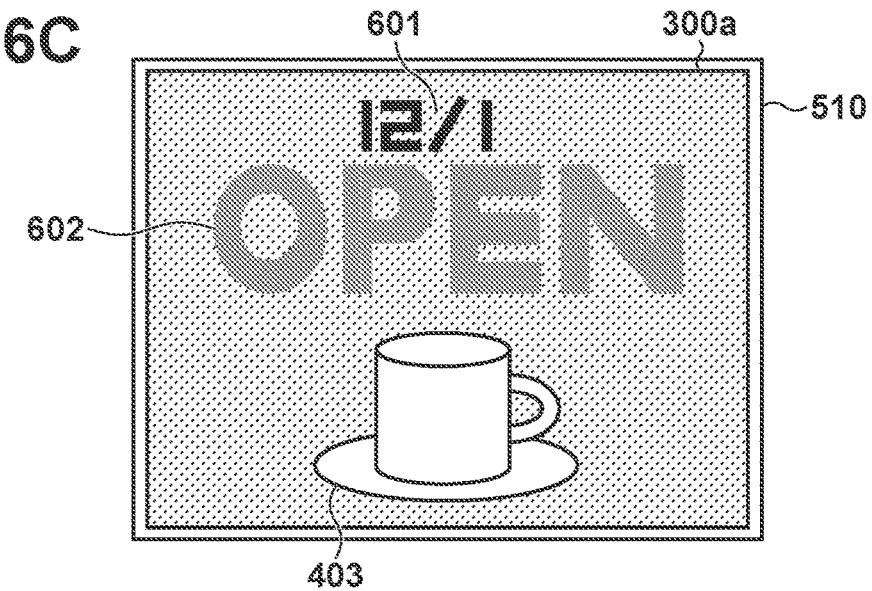

FIGS. 6A to 6C are views showing examples of the preview screen displayed on the display panel 510.

FIG. 6A shows the preview screen when performing spot color printing of all objects printable by spot color printing. For example, if the option (i) button 521 is selected, the preview screen shown in FIG. 6A is displayed. In FIG. 6A, the character string "12/1" 401 and the character string "OPEN" 402 are displayed in, for example, a blinking state such that these can be recognized distinguishably from the objects to be normally printed using normal inks.

FIG. 6B shows the preview screen when performing spot color printing of some of the objects printable by spot color printing. For example, if the option (j) button 522 is selected to cancel the spot color printing designation of the character string "12/1", the preview screen shown in FIG. 6B is displayed. FIG. 6B shows the preview screen when printing the character string "OPEN" 402 by a spot color and printing the character string "12/1" not by a spot color but by a normal color. For example, in a state in which the preview screen shown in FIG. 6A is displayed on the display panel 510, the user selects the option (j) button 522 and selects the character string "12/1" 401 on the display panel 510, the screen switches to the preview screen shown in FIG. 6B. That is, the spot color printing designation of the character string "12/1" is canceled, and the character string "12/1" 401 switches to a character string "12/1" 601. The character string "12/1" 601 is displayed without blinking such that this can be recognized as an object to be normally printed using normal inks.

FIG. 6C shows the preview screen when normally performing all objects. For example, if the option (k) button 523 is selected, the preview screen shown in FIG. 6C is displayed. The character string "12/1" 601 shows a state in which the spot color printing designation of the character string "12/1" printable by spot color printing is canceled, and a character string "OPEN" 602 shows a state in which the spot color printing designation of the character string "OPEN" printable by spot color printing is canceled. In FIG. 6C, the character string "12/1" 601 and the character string "OPEN" 602 are displayed without blinking such that these can be recognized as objects to be normally printed using normal inks.

The user selects, for example, the character string "12/1" 401 in the image 300a previewed on the display panel 510, and subsequently presses the option (j) button 522 on the operation panel 520. Then, the preview display on the display panel 510 switches from FIG. 6A to FIG. 6B to indicate that the spot color printing designation of the character string "12/1" 601 is canceled. The user confirms the display result, and if as intended, presses the decision button 525, thereby instructing the printing apparatus 100 to execute printing. Also, if the option (k) button 523 is selected, the printing apparatus 100 switches the preview display from FIG. 6A to FIG. 6C to display the image 300a in a state in which the spot color printing designation of all objects printable by spot color printing is canceled.

Note that here, an example in which when the character string "12/1" 401 is selected on the display panel 510, and the option (j) button 522 on the operation panel 520 is then pressed, the preview display on the display panel 510 switches from FIG. 6A to FIG. 6B has been described. However, a configuration in which the spot color designation of a selected object is canceled after the option (j) button 522 is pressed can also be employed.

If cancel of spot color printing designation is selected, the image data processing part 206 switches pixel values designated for spot color printing to normal pixel values. When the spot color printing designation is canceled, the pixel values switch to pixel values for which normal inks are used, and normal printing is performed. For example, assume that cancel of spot color printing designation is instructed for the character string "OPEN" 402. At this time, the image data processing part 206 replaces the pixel value [253, 253, 253] of fluorescent yellow designated for the character string "OPEN" 402 with a pixel value [255, 255, 0] of yellow of a process color, thereby generating new image data (corrected data).

(Example of Processing)

Figure 7:
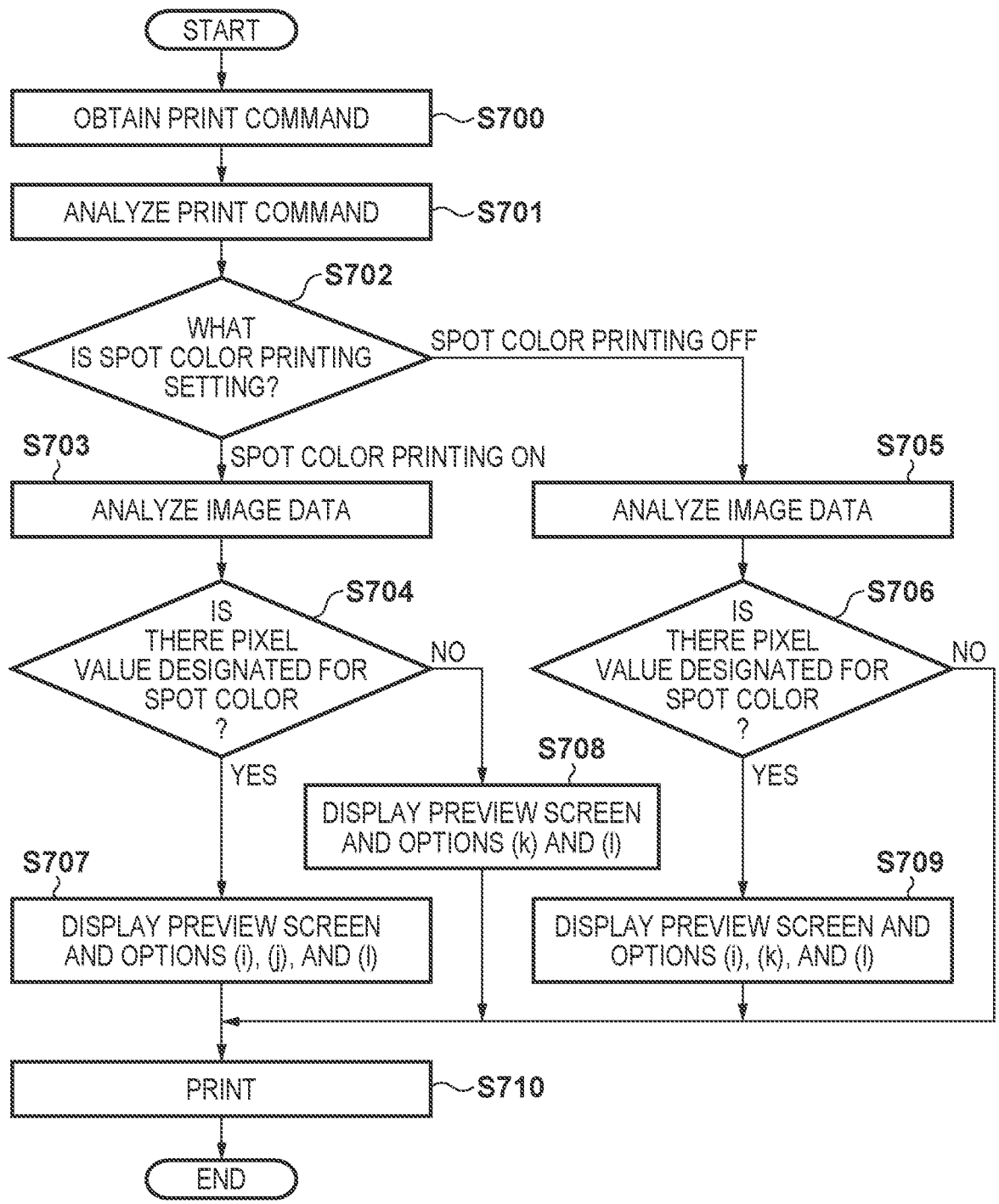
FIG. 7 is a flowchart showing an example of processing of a CPU.

FIG. 7 is a flowchart showing an example of processing of the CPU 201. In this embodiment, if the printing apparatus 100 receives (acquires) the print data 310, the display contents of the display unit 207 are decided based on the information about spot color printing included in the print data 310. An example will be described below. Note that this flowchart is implemented when the CPU 201 reads out a program stored in the nonvolatile memory 203 to the volatile memory 202 and executes it, and the constituent elements of the printing apparatus 100 thus operate.

In step S700, the CPU 201 acquires the print data 310. For example, the CPU 201 stores, in the HDD 204, the print data 310 received from the information processing apparatus 110 via the network 120 and the I/F part 209, thereby acquiring the print data 310. Also, the print data 310 here includes the image data 300 concerning the image 300a of the print target.

Note that the printing apparatus 100 can also acquire the print data 310 by a method other than receiving the print data 310 from the information processing apparatus 110. For example, the printing apparatus 100 may acquire the print data 310 when an external memory (a USB memory or the like) in which the print data 310 created by application software is stored in advance is inserted into the printing apparatus 100. In this case, triggered by the insertion of the USB memory to a USB port included in the I/F part 209 of the printing apparatus 100, the CPU 201 copies the print data 310 in the USB memory to the HDD 204. More specifically, assume that in a state in which, for example, the USB memory is inserted into the USB port, "execute printing from USB memory" (not shown) displayed on the operation panel 520 is selected. Then, the CPU 201 starts the flowchart shown in FIG. 7 and acquires the print data 310 in the USB memory in step S700.

In step S701, analysis of the print command 311 is executed. Based on an instruction from the CPU 201, the print data analysis part 205 analyzes the print command 311 included in the print data 310 stored in the HDD 204. In this embodiment, the print data analysis part 205 analyzes the print command 311 described in the XML format, and reads out the print settings of the print data 310. The CPU 201 stores, in the volatile memory 202, the print settings read out by the print data analysis part 205.

In step S702, the CPU 201 determines which one of "perform spot color printing" and "not perform spot color printing" is set as the spot color print setting in the readout print settings. If the spot color print setting is "perform spot color printing", the CPU 201 advances to step S703. If the spot color print setting is "not perform spot color printing", the CPU 201 advances to step S705.

If the process advances to step S703, analysis of the image data 300 is executed. Based on an instruction from the CPU 201, the image data processing part 206 analyzes whether a pixel value designated for spot color printing is included in the pixel data 320 of the image data 300. More specifically, first, the image data processing part 206 analyzes the header 312 of the image data 300, acquires the pixel value designated for spot color printing, and holds this in the volatile memory 202. In the example shown in FIG. 3B, the image data processing part 206 acquires the pixel values [R, G, B]=[253, 253, 253] and [254, 254, 254] designated for spot color printing and holds these in the volatile memory 202. Then, the image data processing part 206 analyzes whether each acquired pixel value designated for the spot color is included in the pixel data 320, and holds the analysis result in the volatile memory 202. In the example shown in FIG. 3B, if the pixel value designated for spot color printing exists in the pixel data 320, the image data processing part 206 judges that the pixel value designated for the spot color exists, and holds the result in the volatile memory 202. On the other hand, if the pixel value designated for spot color printing does not exist in the pixel data 320, the image data processing part 206 judges that the pixel value designated for the spot color does not exist, and holds the result in the volatile memory 202. Note that as described above, in a case of raster data, the region of an arbitrary pixel value (for example, the pixel value [R, G, B]=[253, 253, 253] representing fluorescent pink) can be designated as an object. Hence, it can also be said that the image data processing part 206 judges whether an object designated for spot color printing is included.

In step S704, the CPU 201 determines, based on the analysis result in step S703, whether the pixel value designated for the spot color is included in the pixel data 320. If the pixel value designated for the spot color is included in the pixel data 320, the CPU 201 advances to step S707. Otherwise, the CPU 201 advances to step S708.

If the process advances to step S707, the CPU 201 displays the preview screen on the display panel 510 and displays the option (i) button 521, the option (j) button 522, the option (l) button 524, and the decision button 525 on the operation panel 520. If the process advances to step S707, the spot color print setting is "perform spot color printing", and a pixel value designated for the spot color is included in the pixel data 320 (that is, an object designated for the spot color is included). In such a case, it is considered that the possibility that the user has intention to execute spot color printing is high. Hence, the options are displayed on the operation panel 520 such that the user can select one of (1) print all objects designated for the spot color by spot color printing, (2) individually designate whether to print objects designated for the spot color by spot color printing, and (3) cancel printing. As the preview screen at this time, for example, the preview screen shown in FIG. 6A is displayed. If the decision button 525 is selected in a state in which the option (i) button 521 or the option (j) button 522 is selected on the operation panel 520, the CPU 201 advances to step S710. Note that if the decision button 525 is selected in a state in which the option (l) button 524 is selected on the operation panel 520, the CPU 201 ends the flowchart without executing printing.

On the other hand, if the process advances to step S708, the CPU 201 displays the preview screen on the display panel 510 and displays the option (k) button 523, the option (l) button 524, and the decision button 525 on the operation panel 520. If the process advances to step S707, the spot color print setting is "perform spot color printing", but the pixel value designated for the spot color is not included in the pixel data 320. That is, although the print command 311 sets to perform spot color printing, there exists no object printable by spot color printing. In such a case, the options are displayed on the operation panel 520 such that the user can select one of (1) perform normal printing without using spot color inks and (2) cancel printing. As the preview screen at this time, for example, the preview screen shown in FIG. 6C is displayed. If the decision button 525 is selected in a state in which the option (k) button 523 is selected on the operation panel 520, the CPU 201 advances to step S710. Note that if the decision button 525 is selected in a state in which the option (l) button 524 is selected on the operation panel 520, the CPU 201 ends the flowchart without executing printing.

On the other hand, even in a case where the process advances from step S702 to step S705, analysis of the image data 300 is executed. Detailed processing is the same as in step S703. After that, in step S706, the CPU 201 determines whether the pixel value designated for the spot color is included in the pixel data 320. If the pixel value designated for the spot color is included in the pixel data 320, the CPU 201 advances to step S709. Otherwise, the CPU 201 advances to step S710 without displaying the preview screen and various kinds of options associated with spot color printing.

If the process advances to step S709, the CPU 201 displays the preview screen on the display panel 510 and displays the option (i) button 521, the option (k) button 523, the option (l) button 524, and the decision button 525 on the operation panel 520. If the process advances to step S709, the spot color print setting is "not perform spot color printing", but the pixel value designated for the spot color is included in the pixel data 320 (that is, the object designated for the spot color is included). That is, although the print command 311 sets not to perform spot color printing, it is possible to execute spot color printing. In such a case, the options are displayed on the operation panel 520 such that the user can select one of (1) print all objects designated for the spot color by spot color printing, (2) perform normal printing without using spot color inks, and (3) cancel printing. As the preview screen at this time, for example, the preview screen shown in FIG. 6C is displayed. This can present, to the user, that spot color printing is possible, while giving priority to the setting (not perform spot color printing) of the print command 311. If the decision button 525 is selected in a state in which the option (i) button 521 or the option (k) button 523 is selected on the operation panel 520, the CPU 201 advances to step S710. Note that if the decision button 525 is selected in a state in which the option (l) button 524 is selected on the operation panel 520, the CPU 201 ends the flowchart without executing printing.

On the other hand, if NO in step S706, the process advances to step S710 without performing display of the preview screen and the options as in steps S707 to S709. That is, if the spot color print setting is "not perform spot color printing", and the pixel value designated for the spot color is not included in the image data 300 (that is, the object designated for the spot color is not included), the CPU 201 does not display the preview screen.

Finally, in step S710, the CPU 201 executes printing. Since print processing itself can appropriately employ a known technique, a detailed description thereof will be omitted. As the outline, the CPU 201 causes the image data processing part 206 to convert the pixel data 320 represented by RGB into pixel data represented by CMYK+spot color. Then, the printhead 212 prints the image on a print medium based on the pixel data after the conversion.

Figure 9:
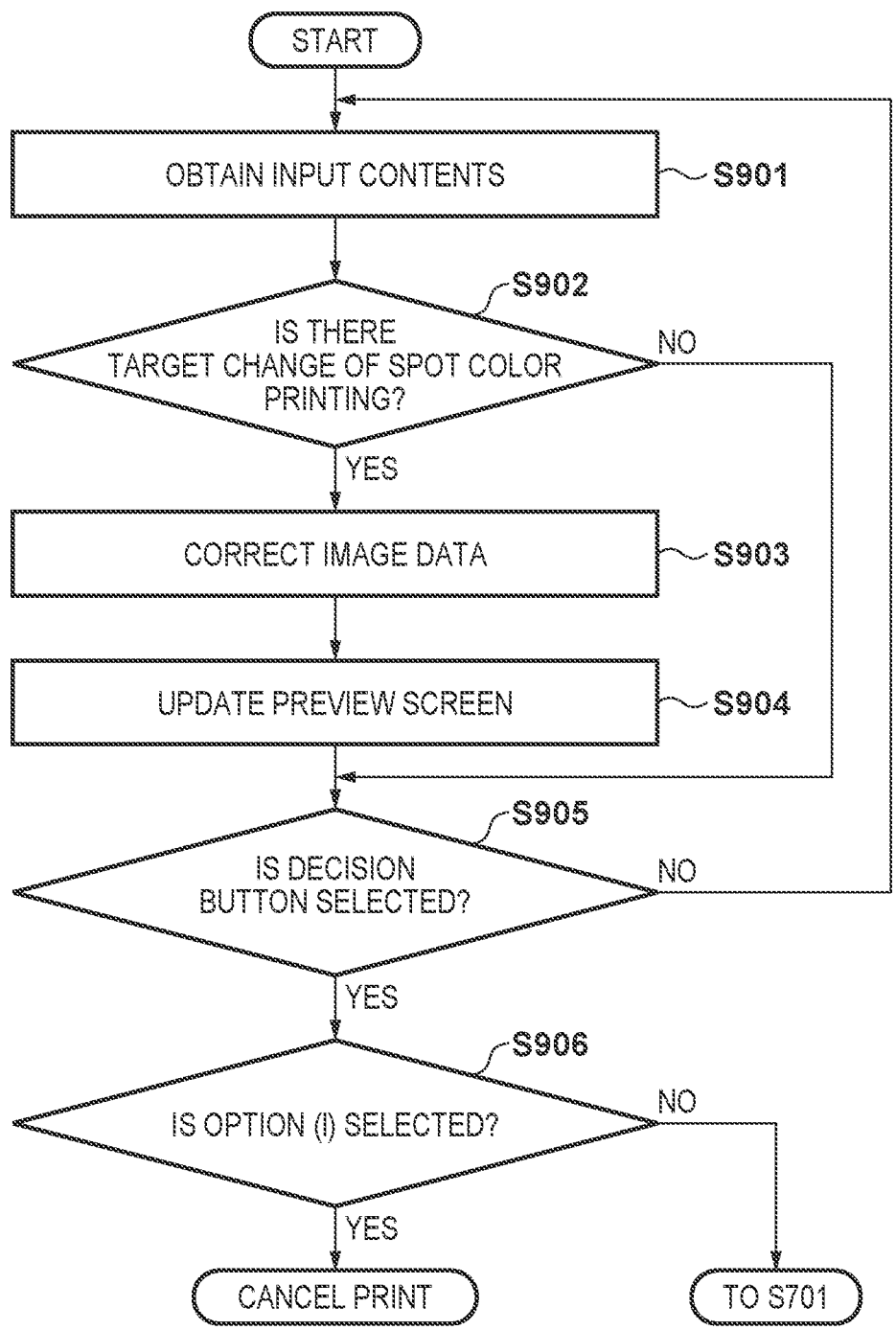
FIG. 9 is a flowchart showing an example of processing of the CPU.

FIG. 9 is a flowchart showing an example of detailed processing in steps S707 to S709. FIG. 9 shows processing of the CPU 201 when updating the screen in accordance with a user operation when the preview screen and the options are being displayed on the display unit 207.

In step S901, the CPU 201 acquires input contents. More specifically, the CPU 201 acquires, from the display unit 207, input contents associated with selection of an object on the display panel 510 or selection of each button on the operation panel 520. In other words, the CPU 201 accepts input to the display unit 207 from the user.

In step S902, the CPU 201 confirms whether a target change of spot color printing exists. If a target change exists, the process advances to step S903. Otherwise, the process advances to step S905. An example of the case where a target change exists is a case where in a state in which the option (j) button 522 is selected on the operation panel 520, some objects are selected on the display panel 510, and spot color printing designation is canceled. Another example is a case where the option (k) button 523 is selected on the operation panel 520 to cancel the spot color printing designation of all objects printable by spot color printing.

In step S903, the CPU 201 corrects the image data. For example, if the option (j) button 522 is selected, and spot color printing designation of the character string "12/1" 401 is canceled, data in which the pixel value of the character string "12/1" 401 is changed from [254, 254, 254] to [255, 255, 0] is generated. That is, the CPU 201 accepts selection of an option displayed on the operation panel 520 in step S901, and corrects the image data 300 in step S903 in correspondence with the option accepted in step S901.

In step S904, the CPU 201 updates the preview screen. Based on the image data 300 corrected in step S903, the CPU 201 updates the preview screen displayed on the display panel 510.

In step S905, the CPU 201 confirms whether the decision button 525 is selected. If the decision button 525 is selected, the process advances to step S906. Otherwise, the process returns to step S901. In step S906, if the option (l) button 524 is selected from the option buttons displayed on the operation panel 520 when the decision button 525 is selected, the CPU 201 cancels printing. If a button other than the option (l) button 524 is selected, the CPU 201 advances to step S710. That is, if the option (l) button 524 is selected, the flowchart is ended without returning to the flowchart shown in FIG. 7. Hence, upon finding that printing cannot be executed based on assumed settings as the result of confirming the preview screen, the user can cancel printing.

According to the above-described example of processing, as shown in steps S707 to S709, the CPU 201 displays, on the display unit 207, at least one of the options of the plurality of print modes with different degrees of use of spot color printing materials in accordance with the information about spot color printing included in the print data 310. Hence, while referring to the preview screen, the user can select the option of the print mode and perform printing as intended.

More specifically, according to the spot color print setting concerning whether to execute spot color printing, which is included in the print command 311, and whether the object designated for the spot color is included in the image data 300, the CPU 201 controls display of the options of the plurality of print modes (steps S702, S704, and the like). Since the options of the print modes are displayed in accordance with both the contents of the settings of spot color printing and the contents of the image 300a itself as the print target, options according to the intention can be presented to the user.

Also, the plurality of options of print modes, which can be displayed on the operation panel 520, include the option (for example, the option (i)) of the print mode in which an object designated for the spot color is printed using a spot color printing material and the option (for example, the option (j) or (k)) for which the degree of use of the spot color printing material is lower than in the above option. Hence, the user can more finely set the print mode of spot color printing.

Also, in some cases, the printing apparatus 100 is configured to hold a print job setting that is made by the user in advance in the nonvolatile memory 203 or the like as a setting on the main body side. According to this embodiment, the preview screen and the options are displayed in accordance with the information about spot color printing included in the image data 300. It is therefore possible to suppress execution of printing based on the setting about spot color printing, which is added by the user to the image data 300 at the time of generation of the image data 300 and changed unintentionally by the setting on the side of the main body of the printing apparatus 100.

Also, if NO in step S706, the CPU 201 executes printing in step S710 without displaying the preview screen on the display panel 510. This can reduce time and effort of user operations associated with printing and improve throughput of printing.

Note that if NO in step S706, the CPU 201 may display the option (l) button 524 and the decision button 525 on the operation panel 520 without displaying the preview on the display panel 510. That is, if the spot color print setting is "not perform spot color printing", and the pixel value designated for the spot color is not included in the pixel data 320 as well, the user may be caused to select whether to execute or cancel normal printing.

Also, the above-described processing is merely an example, and detailed processing contents and processing order can appropriately be changed. For example, after all necessary analysis operations (analysis of the print command 311 (step S701) and analysis of the image data 300 (step S703 or S705)) are performed, the process may advance to each condition branch (step S702, S704, or S706).

Also, in the above-described example of processing, option display patterns are classified into three patterns (or four patterns including non-display) in accordance with the information about spot color printing included in the image data 300. However, how to display the options can appropriately be changed. For example, if the pixel value designated for the spot color is included in the pixel data 320, the CPU 201 may display all the option (i) button 521 to the option (l) button 524 on the operation panel 520 independently of the contents of the spot color print setting in the print command 311.

Second Embodiment

In the second embodiment, a printing apparatus 100 is configured to hold a print job setting that is made by the user in advance in a nonvolatile memory 203 or the like. More specifically, for the printing apparatus 100, one of "perform spot color printing" and "not perform spot color printing" is selected as the main body setting concerning spot color printing. A CPU 201 switches options to be displayed together with a preview screen based on the setting held in the main body as well. Hereinafter, the same reference numerals as in the first embodiment denote the same parts, and a description thereof will sometimes be omitted.

Figure 8:
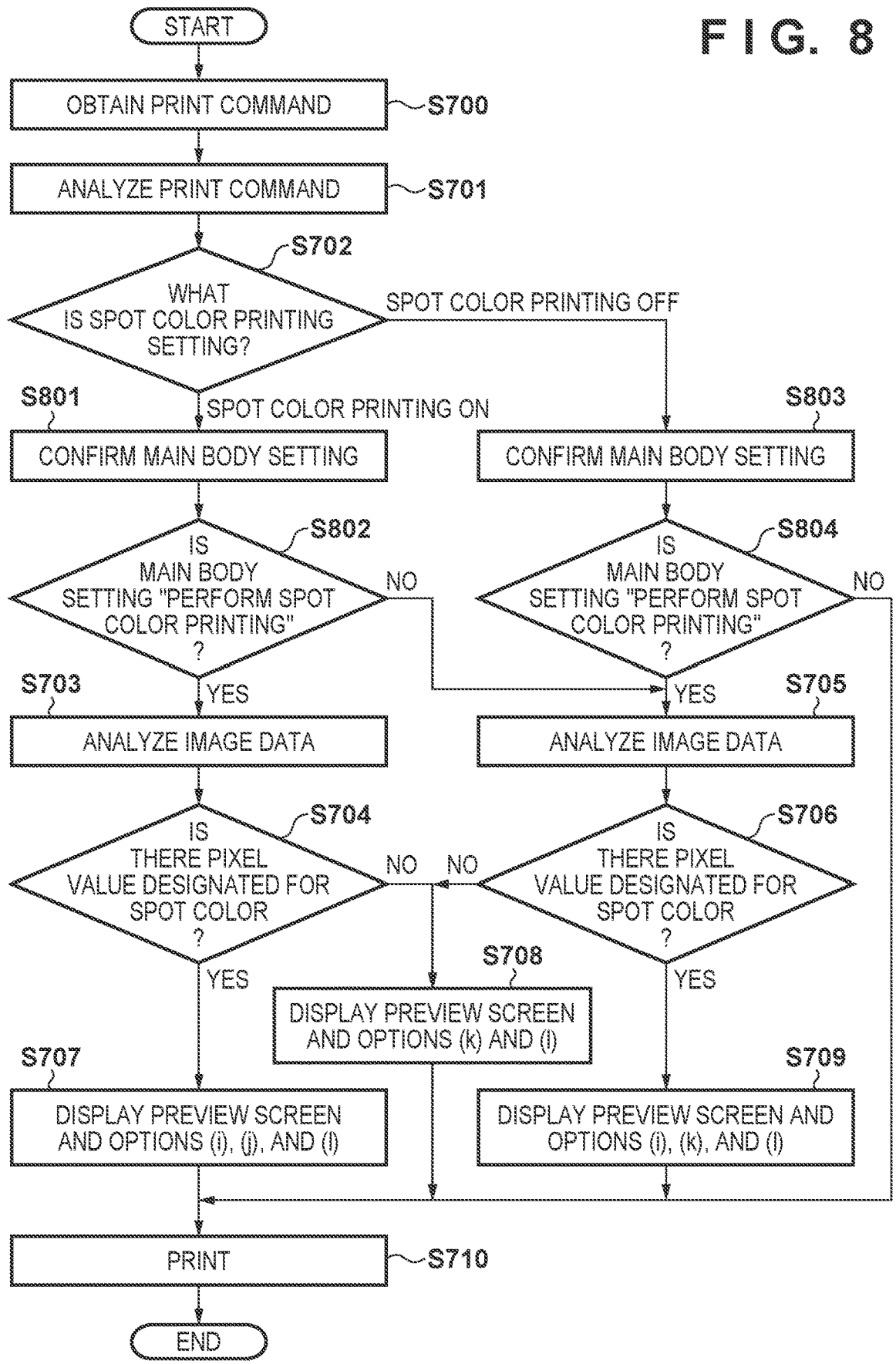
FIG. 8 is a flowchart showing an example of processing of the CPU.

FIG. 8 is a flowchart showing an example of processing of the CPU 201. The same step numbers as in the flowchart of FIG. 7 according to the first embodiment denote same steps. Steps (step S801 to S804) unique to the second embodiment will mainly be described below.

In step S702, if the spot color print setting is "perform spot color printing" as the result of analysis of a print command 311 in step S701, the CPU 201 advances to step S801. If the spot color print setting is "not perform spot color printing", the CPU 201 advances to step S803.

In step S801, the CPU 201 confirms the main body setting. The CPU 201 reads out the setting held in the nonvolatile memory 203 or the like and confirms whether the main body setting is "perform spot color printing" or "not perform spot color printing".

In step S802, if the main body setting is "perform spot color printing" as the result of confirmation in step S801, the CPU 201 advances to step S703. If the main body setting is "not perform spot color printing", the CPU 201 advances to step S705.

On the other hand, in a case where the process advances from step S702 to step S803 as well, the CPU 201 confirms the main body setting, as in a case where the process advances to step S801. Then, in step S804, if the main body setting is "perform spot color printing" as the result of confirmation in step S803, the CPU 201 advances to step S705. If the main body setting is "not perform spot color printing", the CPU 201 advances to step S710 without displaying the preview screen and various kinds of options associated with spot color printing. Hereinafter, processing in each step is the same as in the flowchart of FIG. 7, but some advancing destinations in condition branches are different. More specifically, if NO in step S706, the process advances to step S710 in the flowchart of FIG. 7 but to step S708 in the flowchart of FIG. 8.

The display mode of a display unit 207 in a case where the flowchart shown in FIG. 8 is executed will be described as compared to a case where the flowchart shown in FIG. 7 is executed. FIG. 10A is a view showing the display mode of the display unit 207 in a case where the flowchart shown in FIG. 7 is executed, and FIG. 10B is a view showing the display mode of the display unit 207 in a case where the flowchart shown in FIG. 8 is executed.

For example, consider a case where as the result of analyzing print data 310, the spot color print setting of the print command 311 is "not perform spot color printing", and a pixel value designated for the spot color is not included in image data 300 (condition A). In this case, in the flowchart of FIG. 7, the preview screen and the option buttons are not displayed (NO in step S706 step S710).

On the other hand, in the flowchart of FIG. 8, in the case of the condition A, if the main body setting is "perform spot color printing", the preview screen, an option (k) button 523, and an option (l) button 524 are displayed (NO in step S706 step S708). If the spot color print setting of the print command 311 is "not perform spot color printing", but the main body setting is "perform spot color printing", there is the possibility that the user has intention to execute spot color printing. In this case, the preview screen, the option (k) button 523, and the option (l) button 524 are displayed, thereby causing the user to recognize that spot color printing is not executed for the current image data 300.

Also, for example, consider a case where as the result of analyzing the print data 310, the spot color print setting of the print command 311 is "not perform spot color printing", and a pixel value designated for the spot color is included in the image data 300 (condition B). In this case, in the flowchart of FIG. 7, the preview screen, an option (i) button 521, the option (k) button 523, and the option (l) button 524 are displayed (YES in step S706 step S709).

On the other hand, in the flowchart of FIG. 8, even in the case of the condition B, if the main body setting is "not perform spot color printing", printing is executed without displaying the preview screen and the like. That is, if the spot color print setting of the print command 311 is "not perform spot color printing", and the main body setting is "not perform spot color printing", too, the possibility that the user does not have intention to execute spot color printing is high. Hence, in this case, even if the pixel value designated for the spot color is included in the image data 300, display of the preview screen and the like is omitted, thereby reducing time and effort of user operations.

As described above, according to this embodiment, the preview screen and the options of print modes are presented in accordance with the print data 310 and the main body setting of the printing apparatus 100, thereby presenting the options of print modes more following the intention of the user.

Third Embodiment

Figure 11:
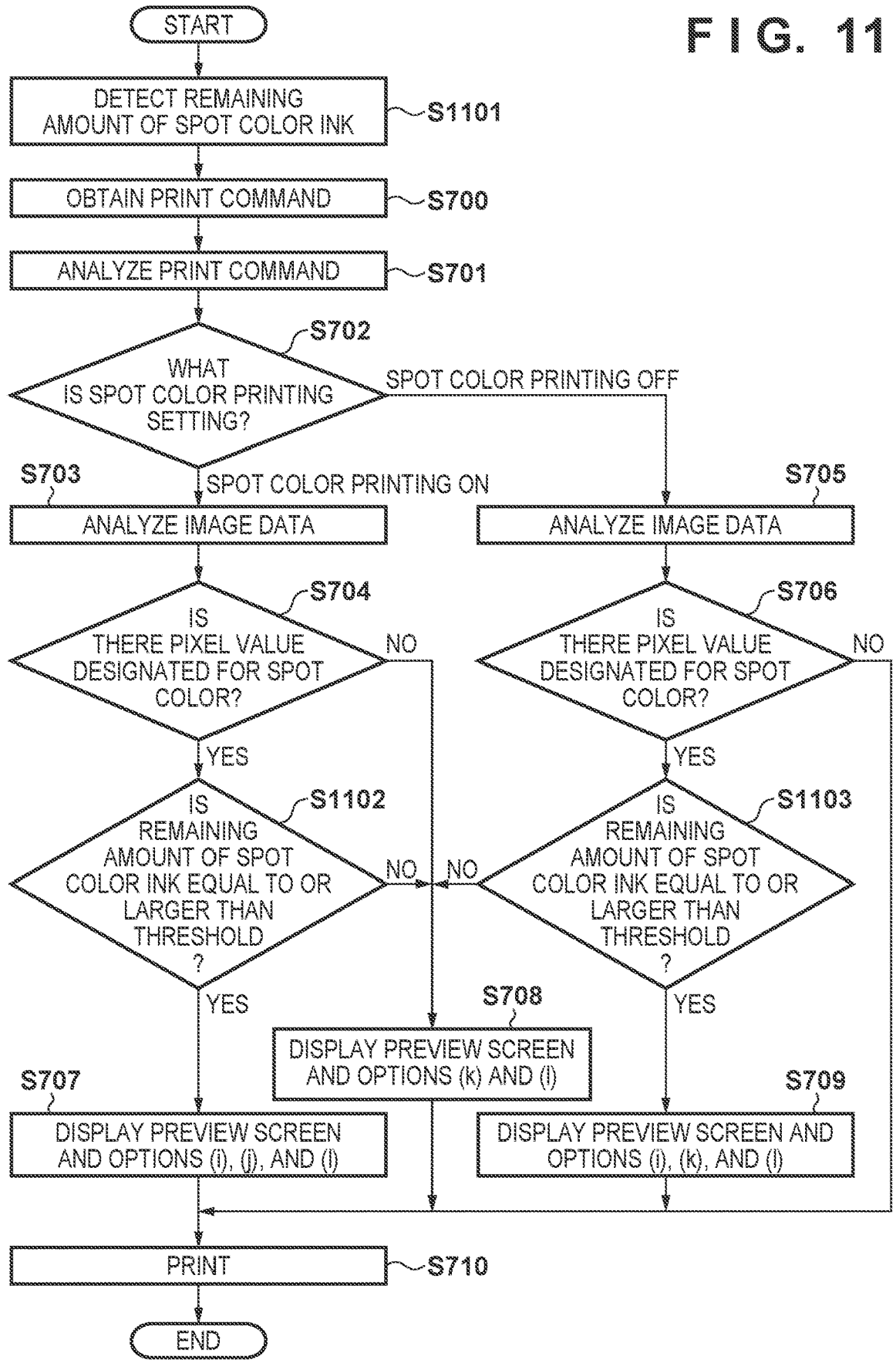
FIG. 11 is a flowchart showing an example of processing of the CPU.

The third embodiment is different from the first embodiment in that the options of print modes to be displayed together with a preview screen are changed in accordance with the remaining amount of a spot color printing material. FIG. 11 is a flowchart showing an example of processing of a CPU 201. The same step numbers as in the flowchart of FIG. 7 according to the first embodiment denote same steps. Steps (step S1101 to S1103) unique to the third embodiment will mainly be described below.

In step S1101, the CPU 201 detects the remaining amount of a spot color ink serving as a spot color printing material. For example, the CPU 201 acquires the measurement value of a sensor provided in an ink tank or estimates the remaining amount from the integrated value of ink discharge amounts in print operations in the past, thereby detecting the remaining amount of the spot color ink. Note that this step may be performed, for example, before steps S1102 and S1103.

Also, if YES in step S704, that is, if the spot color print setting is "perform spot color printing", and a pixel value designated for the spot color is included in image data 300, the CPU 201 advances to step S1102. In step S1102, the CPU 201 confirms whether the spot color ink remaining amount detected in step S1101 is equal to or larger than a threshold. If the remaining amount is equal to or larger than the threshold, the CPU 201 advances to step S707. If the remaining amount is smaller than the threshold, the CPU 201 advances to step S708.

Also, if YES in step S706, that is, if the spot color print setting is "not perform spot color printing", and a pixel value designated for the spot color is included in the image data 300, the CPU 201 advances to step S1103. In step S1103, the CPU 201 confirms whether the spot color ink remaining amount detected in step S1101 is equal to or larger than a threshold. If the remaining amount is equal to or larger than the threshold, the CPU 201 advances to step S709. If the remaining amount is smaller than the threshold, the CPU 201 advances to step S708.

As described above, in this embodiment, if the pixel value designated for the spot color is included in the image data 300, but the remaining amount of the spot color ink is smaller than the threshold, the CPU 201 does not display an option (i) button 521 or an option (j) button 522. That is, if the remaining amount of the spot color printing material is not enough to perform spot color printing, the option of the print mode in which all or some of a plurality of objects designated for the spot color are printed using the spot color printing material is not displayed. It is therefore possible to urge the user to perform normal printing if the remaining amount of the spot color printing material is not sufficient.

Note that if the remaining amount of the spot color ink is smaller than the threshold, the CPU 201 may display, on a display unit 207, a notification representing that printing using the spot color printing material cannot be executed. As a detailed example, the CPU 201 may display, on the display unit 207, a message "spot color printing cannot be executed because the remaining amount of the spot color ink (fluorescent pink) is in shortage". This can urge the user to replenish the spot color printing material in shortage.

Other Embodiments

In the above-described embodiments, the printing apparatus 100 displays the preview screen of an image to be printed and at least one of the options of a plurality of print modes with different degrees of use of spot color printing materials. However, a configuration in which such display control is performed by an information processing apparatus capable of communicating with the printing apparatus can also be employed. For example, in the image processing system 1, the information processing apparatus 110 may execute processing as shown in FIG. 7 instead of the printing apparatus 100. In this case, the CPU of the information processing apparatus 110 can execute generation of the image data 300 and generation of the print data 310 including this by, for example, application software installed in the information processing apparatus 110. The information processing apparatus 110 may analyze the generated print data 310 and according to the analysis result, display the preview screen and the options of print modes on the display part of the information processing apparatus 110.

Also, in the above-described embodiments, the printing apparatus 100 control whether to display the preview screen and the options and which options should be displayed in accordance with the contents of print settings associated with spot color printing included in print data. Note that the present invention is not limited to this form, and, for example, the preview screen may not be displayed. In this case, whether to display the options and which options should be displayed are controlled in accordance with the contents of print settings associated with spot color printing included in print data. Reversely, the options may not be displayed. In this case, only whether to display the preview screen is controlled in accordance with the contents of print settings associated with spot color printing included in print data. Alternatively, for example, whether to display the preview screen and the options may be controlled in accordance with the contents of print settings associated with spot color printing included in print data, and which options should be displayed may not be controlled in accordance with the contents of print settings associated with spot color printing included in the print data. In this form, if the options are to be displayed, same options may uniformly be displayed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070952, filed Apr. 22, 2022, which is hereby incorporated by reference herein in its entirety.

What is claimed is:

1. A printing apparatus capable of performing spot color printing using a spot color printing material of a spot color that is a color different from a process color, comprising:
a memory containing instructions and a processor to execute the instructions to function as:
an acquisition unit configured to acquire print data including image data for an image of a print target, wherein if the print data is data used to cause the printing apparatus to execute the spot color printing, the print data includes information about the spot color printing; and
a display control unit configured to display, on a display part of the printing apparatus, a preview screen of the image of the print target,
wherein whether to display the preview screen on the display part of the printing apparatus is controlled based on the print data.

2. The apparatus according to claim 1, wherein if a print setting corresponding to executing the spot color printing is included in the print data, control is performed to display the preview screen on the display part.

3. The apparatus according to claim 1, wherein if a print setting corresponding to executing the spot color printing is not included in the print data, but a pixel value designated to be printed using the spot color printing material is included in the print data, control is performed to display the preview screen on the display part.

4. The apparatus according to claim 1, wherein if a print setting corresponding to executing the spot color printing is not included in the print data, and a pixel value designated to be printed using the spot color printing material is not included in the print data, control is performed not to display the preview screen on the display part.

5. The apparatus according to claim 1, wherein the instructions are further executed to function as an accepting unit configured to accept a setting concerning whether to execute the spot color printing,
wherein if a print setting corresponding to executing the spot color printing is not included in the print data, but the setting corresponding to executing the spot color printing is accepted by the accepting unit, control is performed to display the preview screen on the display part.

6. The apparatus according to claim 1, wherein the instructions are further executed to function as an accepting unit configured to accept a setting concerning whether to execute the spot color printing,
wherein if a print setting corresponding to executing the spot color printing is not included in the print data, and a setting corresponding to not executing the spot color printing is accepted by the accepting unit, control is performed not to display the preview screen on the display part.

7. The apparatus according to claim 1, wherein together with the preview screen, the display control unit displays, on the display part, at least one of options of a plurality of print modes with different degrees of use of the spot color printing material in accordance with the information about the spot color printing included in the print data.

8. The apparatus according to claim 7, wherein
the print data further includes a spot color print setting concerning whether to execute the spot color printing, and
the display control unit displays at least one of the options of the plurality of print modes in accordance with the spot color print setting and whether an object designated for the spot color is included in the image data.

9. The apparatus according to claim 8, wherein
the options of the plurality of print modes include:
a first option that is an option of a print mode in which the object designated for the spot color is printed using the spot color printing material; and
a second option that is an option of a print mode in which the degree of use of the spot color printing material is lower than in the first option.

10. The apparatus according to claim 8, wherein the options of the plurality of print modes include:
a third option that is an option of a print mode in which all objects of a plurality of objects designated for the spot color are printed using the spot color printing material;
a fourth option that is an option of a print mode in which some objects of the plurality of objects are printed using the spot color printing material; and
a fifth option that is an option of a print mode in which the plurality of objects designated for the spot color are printed without using the spot color printing material.

11. The apparatus according to claim 10, wherein the instructions are further executed to function as a first accepting unit configured to accept selection of an object to be printed using the spot color printing material from the plurality of objects,
wherein the some objects are objects whose selection is accepted by the first accepting unit.

12. The apparatus according to claim 10, wherein if the spot color print setting indicates executing the spot color printing, and the object designated for the spot color is included in the image data, the display control unit displays at least the third option and the fourth option.

13. The apparatus according to claim 10, wherein if the spot color print setting indicates not executing the spot color printing, and the object designated for the spot color is included in the image data, the display control unit displays at least the third option and the fifth option.

14. The apparatus according to claim 1, wherein the display control unit displays, on the display part, a sixth option for canceling printing together with at least one of options of a plurality of print modes.

15. The apparatus according to claim 1, wherein the instructions are further executed to function as:
a second accepting unit configured to accept selection of an option displayed on the display part; and
a correction unit configured to correct the image data in correspondence with the option accepted by the second accepting unit.

16. The apparatus according to claim 15, wherein the display control unit updates the preview screen based on the image data corrected by the correction unit.

17. The apparatus according to claim 10, wherein the instructions are further executed to function as a detection unit configured to detect a remaining amount of the spot color printing material,
wherein if the remaining amount of the spot color printing material is smaller than a threshold, the display control unit does not display the third option and the fourth option on the display part.

18. The apparatus according to claim 1, wherein the instructions are further executed to function as a detection unit configured to detect a remaining amount of the spot color printing material,
wherein if the remaining amount of the spot color printing material is smaller than a threshold, the display control unit displays a notification representing that printing using the spot color printing material cannot be executed.

19. A method comprising:
acquiring print data including image data for an image of a print target, wherein if the print data is data used to cause a printing apparatus to execute spot color printing using a spot color printing material of a spot color that is a color different from a process color, the print data includes information about the spot color printing; and
displaying, on a display part, a preview screen of the image of the print target,
wherein whether to display the preview screen on the display part is controlled based on the print data.

20. A non-transitory computer-readable storage medium storing a program configured to cause a computer to function to:
acquire print data including image data for an image of a print target, wherein if the print data is data used to cause a printing apparatus to execute spot color printing using a spot color printing material of a spot color that is a color different from a process color, the print data includes information about the spot color printing; and
display, on a display part of the printing apparatus, a preview screen of the image of the print target,
wherein whether to display the preview screen on the display part is controlled based on the print data.

* * * * *